United States Patent
Chen et al.

(10) Patent No.: US 10,649,501 B1
(45) Date of Patent: May 12, 2020

(54) TOUCHPAD DEVICE

(71) Applicant: Chicony Electronics Co., Ltd., New Taipei (TW)

(72) Inventors: Chia-Hsin Chen, New Taipei (TW); Mitsuo Horiuchi, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 16/217,012

(22) Filed: Dec. 11, 2018

(30) Foreign Application Priority Data

Oct. 25, 2018 (TW) .............................. 107137832 A (51) Int. Cl.
*G06F 1/16* (2006.01)
*G06F 3/0354* (2013.01)

(52) U.S. Cl.
CPC ............ *G06F 1/169* (2013.01); *G06F 1/1681* (2013.01); *G06F 3/03547* (2013.01)

(58) Field of Classification Search
USPC .......................................... 345/157, 170–178
See application file for complete search history.

(56) References Cited

U.S. PATENT DOCUMENTS

| | | | | |
|---|---|---|---|---|
| 2016/0139637 A1* | 5/2016 | Doi | ........................ | G06F 1/1679 361/679.4 |
| 2016/0147328 A1* | 5/2016 | Doi | ........................ | G06F 1/169 345/157 |
| 2017/0322591 A1* | 11/2017 | Lee | ........................ | G06F 1/16 |
| 2017/0329426 A1* | 11/2017 | Han | ........................ | G06F 3/0362 |
| 2018/0055485 A1* | 3/2018 | Lalena | ................ | G01S 7/52084 |
| 2018/0081477 A1* | 3/2018 | Picciotto | ................. | G06F 3/044 |
| 2019/0212861 A1* | 7/2019 | Monson | ................ | G06F 3/0446 |
| 2019/0243475 A1* | 8/2019 | Huang | ................ | G06F 3/03547 |
| 2019/0348983 A1* | 11/2019 | Edgar | ................ | G06F 3/03547 |
| 2019/0384426 A1* | 12/2019 | Huang | ................ | G06F 3/03547 |
| 2019/0385800 A1* | 12/2019 | Huang | ................... | H01H 13/52 |

FOREIGN PATENT DOCUMENTS

| | | |
|---|---|---|
| TW | M485594 U | 9/2014 |
| TW | M4924582458 U | 12/2014 |

* cited by examiner

*Primary Examiner* — Tony O Davis
(74) *Attorney, Agent, or Firm* — CKC & Partners Co., LLC (57) ABSTRACT

A touchpad device is used to connect a first fixing portion of a housing. The touchpad device includes a hinge structure and a circuit board. The hinge structure includes a main body and an elastic arm. The main body is located above the first fixing portion. The elastic arm is connected to the main body and includes a second fixing portion. The second fixing portion is fixed to the first fixing portion of the housing. A bottom surface of the circuit board is attached to a top surface of the main body.

14 Claims, 10 Drawing Sheets

TOUCHPAD DEVICE

CROSS-REFERENCE TO RELATED APPLICATION

This application claims priority to Taiwan Application Serial Number 107137832, filed Oct. 25, 2018, which is herein incorporated by reference.

BACKGROUND

Technical Field

The present disclosure relates to a touchpad device.

Description of Related Art

With developments of technologies, touchpad devices have been widely used in portable electronic products such as notebook computers, tablet computers, and personal digital assistants. By sensing movements of users' fingers, the touchpad devices can synchronize corresponding movements of cursors. Therefore, the touchpad devices can replace mice as the input and operation devices.

In order to provide users the function of generating a click command by pressing, a conventional touchpad device usually needs a metal sheet to be fixed to a housing under a circuit board and components (e.g., a stiffener, a balance bar, or the like) to be disposed between the circuit board and the metal sheet in addition to disposing a pivot to make the circuit board be able to rotate relative to the housing, such that the overall structural strength and the balance stability of the touchpad device can be improved. However, in the current trend of all kinds of electronic devices being designed to be thin, light, and short, the aforementioned touchpad device itself or an electronic apparatus using the same is not conducive to thinness.

Accordingly, how to provide a touchpad device to solve the aforementioned problems becomes an important issue to be solved by those in the industry.

SUMMARY

An aspect of the disclosure is to provide a touchpad device that can efficiently solve the aforementioned problems.

According to an embodiment of the disclosure, a touchpad device is used to connect a first fixing portion of a housing. The touchpad device includes a hinge structure and a circuit board. The hinge structure includes a main body and an elastic arm. The main body is located above the first fixing portion. The elastic arm is connected to the main body and includes a second fixing portion. The second fixing portion is fixed to the first fixing portion of the housing. A bottom surface of the circuit board is attached to a top surface of the main body.

In an embodiment of the disclosure, the main body has a through hole. The elastic arm further includes a first extending portion. The first extending portion is connected between an inner edge of the through hole and the second fixing portion. A step is formed between the first extending portion and the inner edge of the through hole.

In an embodiment of the disclosure, the hinge structure further includes a ground bump. The ground bump is disposed on the main body and abuts against the circuit board.

In an embodiment of the disclosure, the hinge structure further includes a cantilever and a ground bump. The cantilever extends from an edge of the main body. The ground bump is disposed on the cantilever and abuts against the circuit board.

In an embodiment of the disclosure, the touchpad device further includes a stiffener attached to the bottom surface of the circuit board.

In an embodiment of the disclosure, the hinge structure further includes two clamping arms. The stiffener is clamped between the clamping arms.

In an embodiment of the disclosure, the stiffener has a retaining portion extending below an end of the elastic arm.

In an embodiment of the disclosure, the circuit board has a first edge and a second edge opposite each other. The hinge structure and the stiffener are respectively adjacent to the first edge and the second edge.

In an embodiment of the disclosure, thicknesses of the stiffener are reduced substantially from the first edge to two ends of the second edge.

In an embodiment of the disclosure, the stiffener is inwardly shrunk relative to two corners of the second edge of the circuit board to form two unfilled corners.

In an embodiment of the disclosure, the touchpad device further includes an edge frame attached to the bottom surface of the circuit board and abutting against an edge of the circuit board.

In an embodiment of the disclosure, a gap is formed between the main body of the hinge structure and the edge frame. A part of the gap is substantially S-shaped.

In an embodiment of the disclosure, the edge frame includes a base and a sidewall connected to each other. The base is attached to the bottom surface of the circuit board. The sidewall abuts against the edge of the circuit board.

In an embodiment of the disclosure, the base has a plurality of protrusions at a bottom surface thereof.

Accordingly, in the touchpad device of the present disclosure, the main body of the hinge structure is attached to the bottom surface of the circuit board, and the elastic arm of the hinge structure downwardly extends and is fixed to the housing, so that the circuit board can swing relative to the housing by actions of the hinge structure. Because the circuit board and the housing are only connected by the hinge structure, the thickness of the whole touchpad device can be effectively reduced. Furthermore, by attaching the stiffener to the bottom surface of the circuit board, the support to the circuit board can be further increased. In addition, by partially extending the stiffener below the elastic arm of the hinge structure to retain the elastic arm, the touchpad device can prevent from damage due to large deformation of the hinge structure while falling down.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 1:
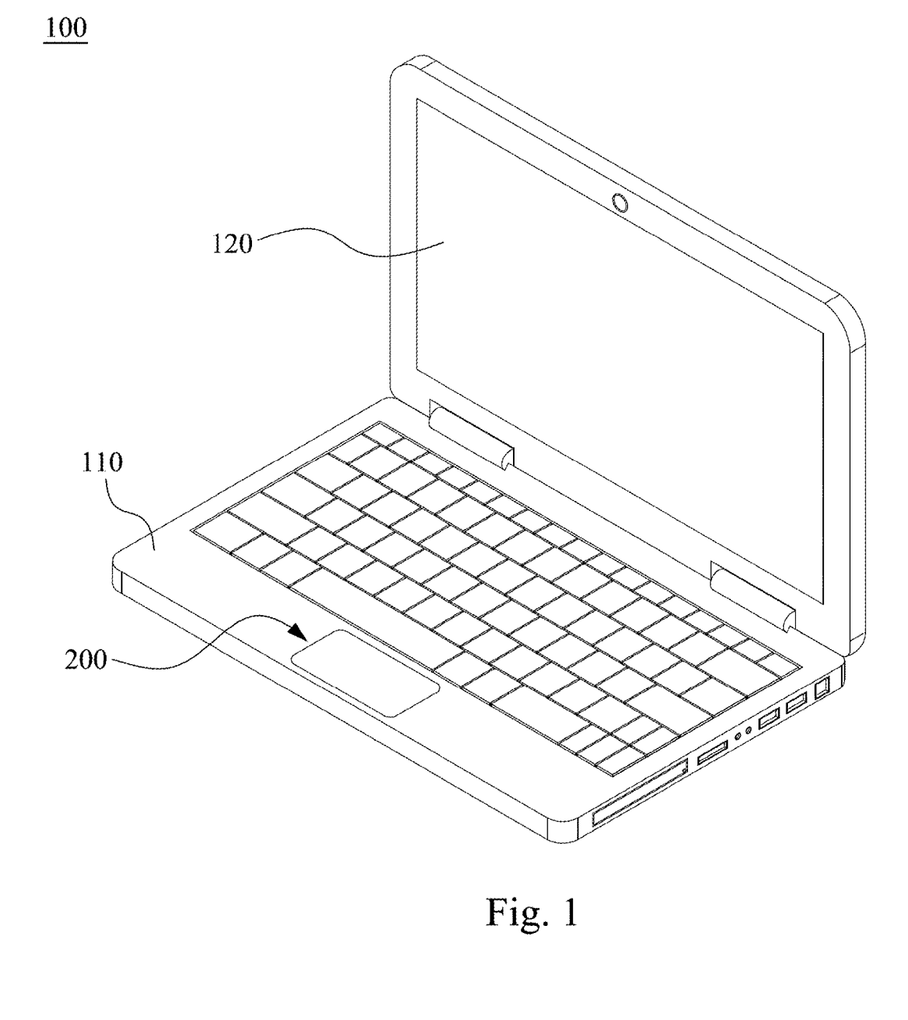
FIG. 1 is a perspective view of an electronic apparatus according to some embodiments of the disclosure.

Reference is made to FIG. 1. FIG. 1 is a perspective view of an electronic apparatus 100 according to some embodiments of the disclosure. As shown in FIG. 1, the electronic apparatus 100 includes a host 110, a display 120, and a touchpad device 200. The touchpad device 200 is an input device disposed on the host 110, but the disclosure is not limited in this regard. In practical applications, the touchpad device 200 can be an electronic product (e.g., a personal digital assistant, a keyboard with a touchpad, and etc.) that uses a touchpad as the input or operation interface. That is, concepts of the touchpad device 200 of the disclosure can be used in any electronic product that uses a touchpad as the input or operation interface. Structures and functions of some components included in the touchpad device 200 and connection and action relationships among these components are introduced in detail below.

Figure 2A:
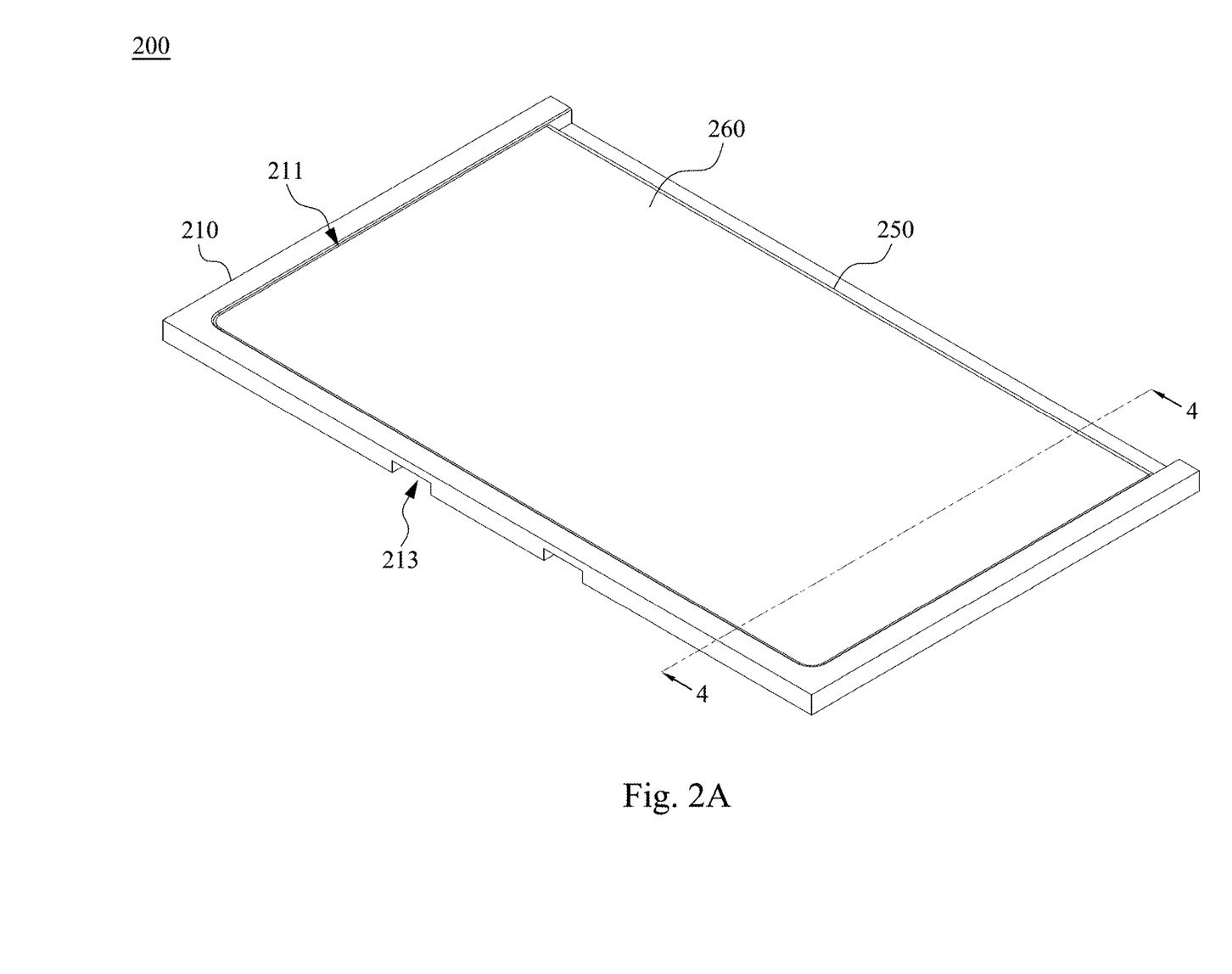
FIG. 2A is a perspective view of a touchpad device in FIG. 1.
Figure 2B:
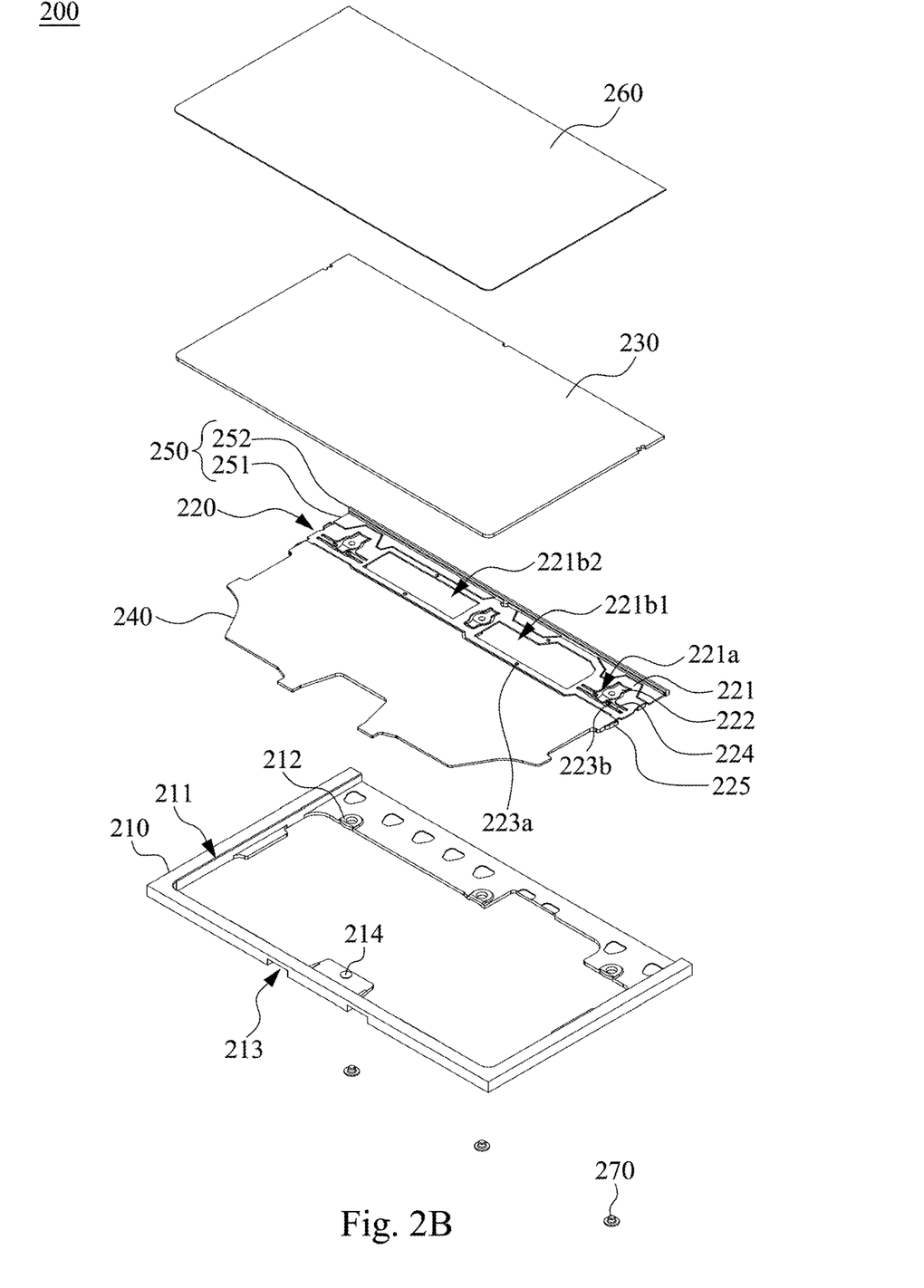
FIG. 2B is an exploded view of the touchpad device in FIG. 2A.
Figure 3:
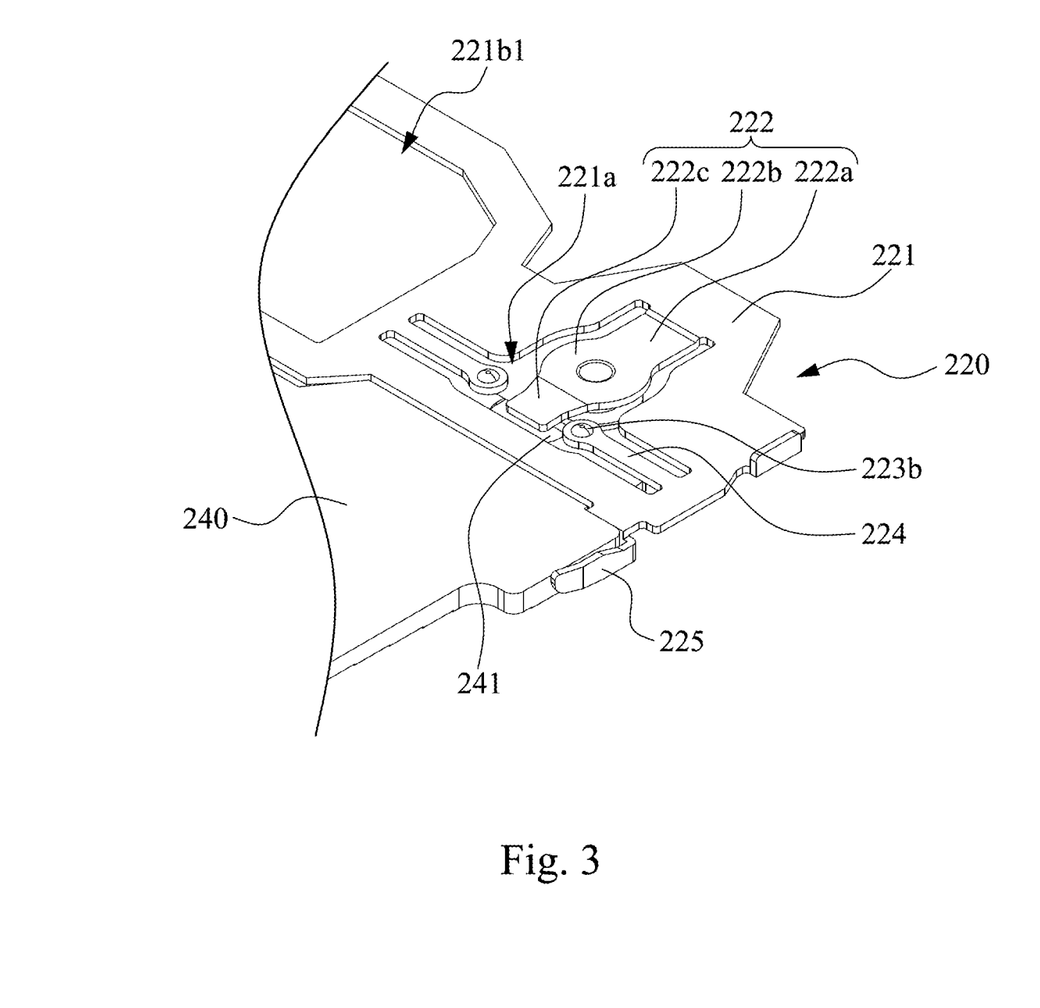
FIG. 3 is a perspective view of a hinge structure and a stiffener in FIG. 2B.
Figure 4:
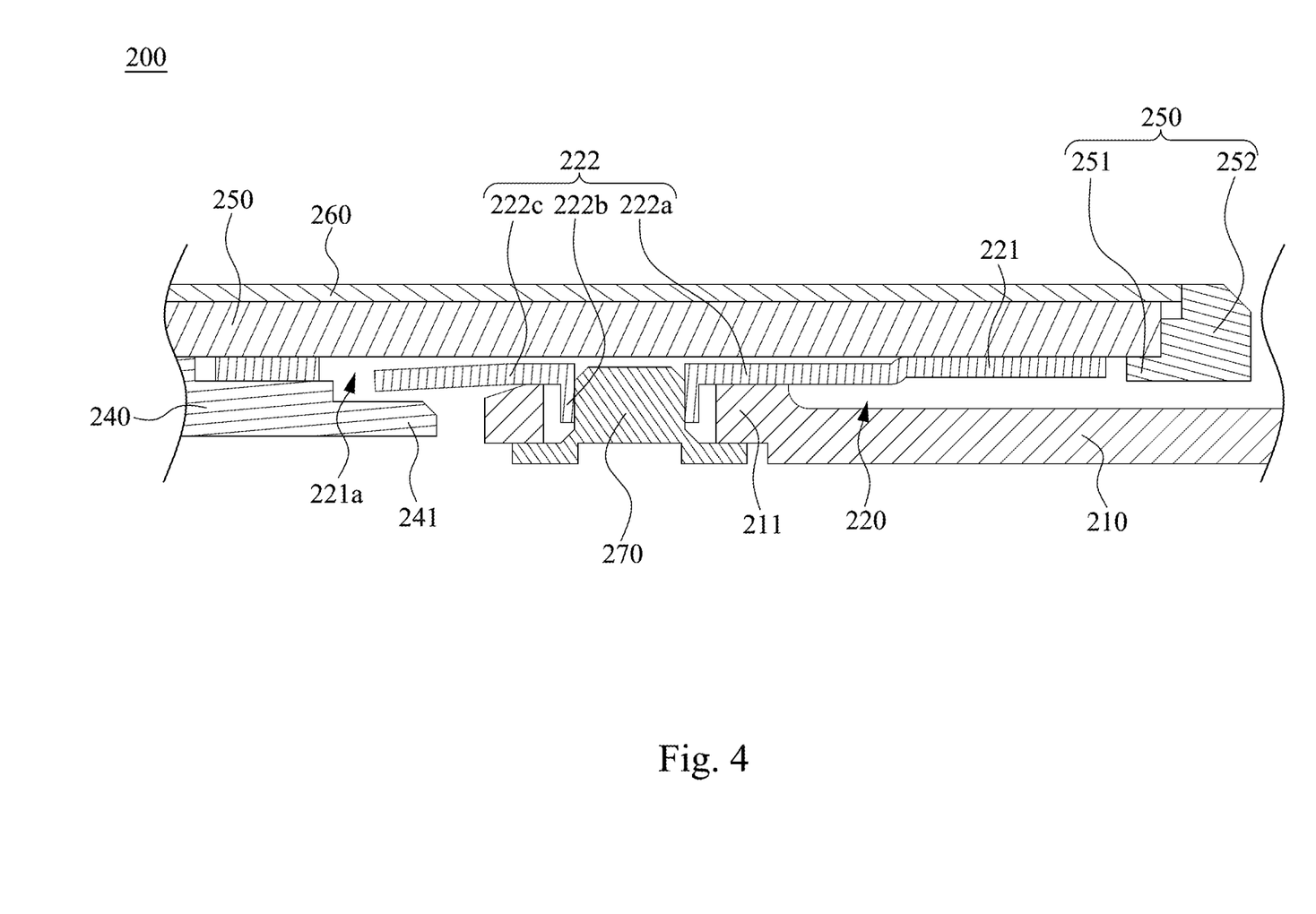
FIG. 4 is a cross-sectional view of the touchpad device in FIG. 2A taken along line 4-4.

Reference is made to FIGS. 2A to 4. FIG. 2A is a perspective view of a touchpad device 200 in FIG. 1. FIG. 2B is an exploded view of the touchpad device 200 in FIG. 2A. FIG. 3 is a perspective view of a hinge structure 220 and a stiffener 240 in FIG. 2B. FIG. 4 is a cross-sectional view of the touchpad device 200 in FIG. 2A taken along line 4-4. As shown in FIGS. 2A to 4, in the present embodiment, the touchpad device 200 includes a hinge structure 220 and a circuit board 230 and is installed on a housing 210. In the present embodiment, the housing 210 is a part of the chassis of the host 110 (e.g., the C piece of a notebook computer), but the disclosure is not limited in this regard. The housing 210 has an opening 211 and a first fixing portion 212. The first fixing portion 212 extends into the opening 211 from an inner edge of the opening 211. The hinge structure 220 is located in the opening 211 and includes a main body 221 and an elastic arm 222. The main body 221 is located above the first fixing portion 212. The elastic arm 222 is connected to the main body 221 and includes a second fixing portion 222b. The second fixing portion 222b is fixed to the first fixing portion 212 of the housing 210. A bottom surface of the circuit board 230 is attached to a top surface of the main body 221. The elastic arm 222 extends below the bottom surface of the circuit board 230 relative to the main body 221. In other words, as shown in FIG. 4, the main body 221 and the elastic arm 222 are not coplanar and form a step therebetween. Preferably, the touchpad device 200 further includes a cover layer 260. The cover layer 260 is disposed on a top surface of the circuit board 230 for touches and operations of fingers of a user. In the present embodiment, the cover layer 260 is a piece of polyester resin (Mylar) attached to the circuit board 230, but the disclosure is not limited in this regard.

With the foregoing structural configurations, when a user presses the cover layer 260 on the circuit board 230, the hinge structure 220 will be extruded and deformed by the downwardly moving circuit board 230, so as to make the cover layer 260 and the circuit board 230 move toward the first fixing portion 212 of the housing 210. Because the touchpad device 200 of the present embodiments can achieve the purpose of swinging the cover layer 260 and the circuit board 230 relative to the housing 210 only by the hinge structure 220 connected between the circuit board 230 and the housing 210, the thickness of the whole touchpad device 200 can be effectively reduced. In the present embodiment, the hinge structure 220 can be a sheet metal structure made of a metal plate by, for example, a stamping process, which is conducive to the thinness of a product, but the disclosure is not limited in this regard.

As shown in FIGS. 2B to 4, in the present embodiment, the main body 221 of the hinge structure 220 has a through hole 221a. The elastic arm 222 of the hinge structure 220 is connected to an inner edge of the through hole 221a and extends downwardly to the first fixing portion 212 of the housing 210. Specifically, the elastic arm 222 further includes a first extending portion 222a. The first extending portion 222a is connected between the inner edge of the through hole 221a and the second fixing portion 222b, and the step is formed between the first extending portion 222a and the inner edge of the through hole 221a.

Figure 8:
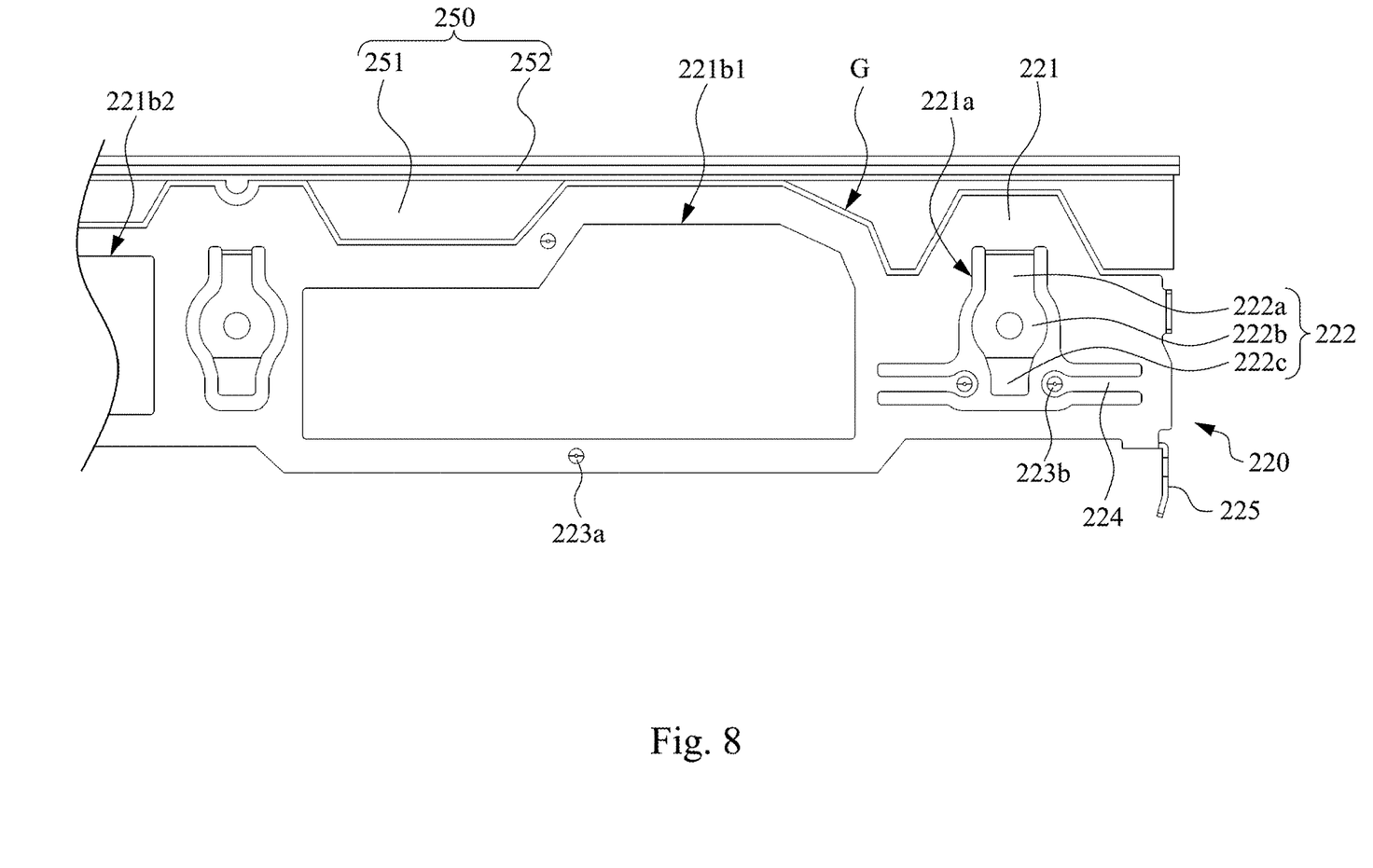
FIG. 8 is a partial top view of the hinge structure in FIG. 2B.

As shown in FIG. 2B with reference to FIG. 8, in the present embodiment, the hinge structure 220 has three sets of combination of the through hole 221a and the elastic arm 222, in which a width of the first extending portion 222a of the middle elastic arm 222 is smaller than widths of the first extending portions 222a of the elastic arms 222 at two sides. As such, when one of the elastic arms 222 at two sides fails, the middle elastic arm 222 can play the role of auxiliary support. Even the elastic arms 222 at two sides do not fail, the middle elastic arm 222 does not provide too much support between the circuit board 230 and the housing 210 owing to the first extending portion 222a with the smaller width, so the problem that the hinge structure 220 is not easily deformed by pressing is avoided. In practical applications, the number of the sets of combination of the through hole 221a and the elastic arm 222 is not limited by the embodiments illustrated by FIG. 2B and can be flexibly changed.

As shown in FIGS. 2B and 3, in the present embodiment, the hinge structure 220 further includes a plurality of ground bumps 223a. The ground bumps 223a are discretely disposed on the main body of the main body 221 and abut against the circuit board 230. In addition, the hinge structure 220 further includes plurality sets of combination of a cantilever 224 and a ground bump 223b. The cantilever 224 extends from an edge of the main body 221. The ground bump 223b is disposed on a top surface of the cantilever 224 and abuts against the circuit board 230. In the present embodiment, the cantilever 224 is also connected to the inner edge of the through hole 221a of the main body 221. In some embodiments, the cantilever 224 and the ground bump 223b are coplanar, so as to ensure that the ground bump 223b on the cantilever 224 can exactly abut against the bottom surface of the circuit board 230. Therefore, when the electro-static Discharge (ESD) phenomenon caused by the electrostatic charge carried by the user's finger is transferred to the touchpad device 200, the external static electricity is easy to penetrate and destroy the circuit board 230, and the configuration of the ground bumps 223a and the ground bumps 223b can lead the static electricity to ground and avoid the damage of the circuit board 230.

In some embodiments, the elastic arm 222 and the cantilevers 224 within the inner edge of the same through hole 221a have different extending directions. In some embodiments, the extending directions of the elastic arm 222 and the cantilevers 224 within the inner edge of the same through hole 221a are substantially perpendicular to each other, but the disclosure is not limited in this regard. In practical applications, the number of the cantilevers 224 within the inner edge of the same through hole 221a is not limited by the embodiments as illustrated by FIG. 3 and can be flexibly changed.

In some embodiments, the main body 221 of the hinge structure 220 further has hollow portions 221b1, 221b2. The hollow portions 221b1, 221b2 can give way to electronic parts on the circuit board 230 (e.g., electrical connectors or antennas).

In practical applications, the main body 221 (including the through hole 221a, the hollow portions 221b1, 221b2, and the ground bumps 223a thereon) of the hinge structure 220, the elastic arm 222, and the cantilever 224 (including the ground bump 223b thereon) can be made from a sheet metal by, for example, a stamping process, but the disclosure is not limited in this regard.

As shown in FIGS. 2B and 4, in the present embodiment, the first fixing portion 212 is fixed below the second fixing portion 222b. The touchpad device 200 further includes a fastening member 270. The fastening member 270 fastens the first fixing portion 212 of the housing 210 from the bottom to the second fixing portion 222b of the elastic arm 222. In practical applications, the first fixing portion 212 of the housing 210 and the second fixing portion 222b of the elastic arm 222 can also be fixed in other ways, such as welding, riveting, or the like.

As shown in FIGS. 2B and 3, in the present embodiment, the touchpad device 200 further includes a stiffener 240 attached to the bottom surface of the circuit board 230 (for example, adhering by glue). By attaching the stiffener 240 to the bottom surface of the circuit board 230, the support to the circuit board 230 can be further increased. In addition, the hinge structure 220 further includes two clamping arms 225. The stiffener 240 is clamped between the clamping arms 225. As such, the two clamping arms 225 can assist the assembler in assembling the stiffener 240 to an edge of the hinge structure 220 and strengthen the fixing strength between the hinge structure 220 and the stiffener 240.

In some embodiments, the hinge structure 220 and the stiffener 240 can form a unitary piece.

Figure 5:
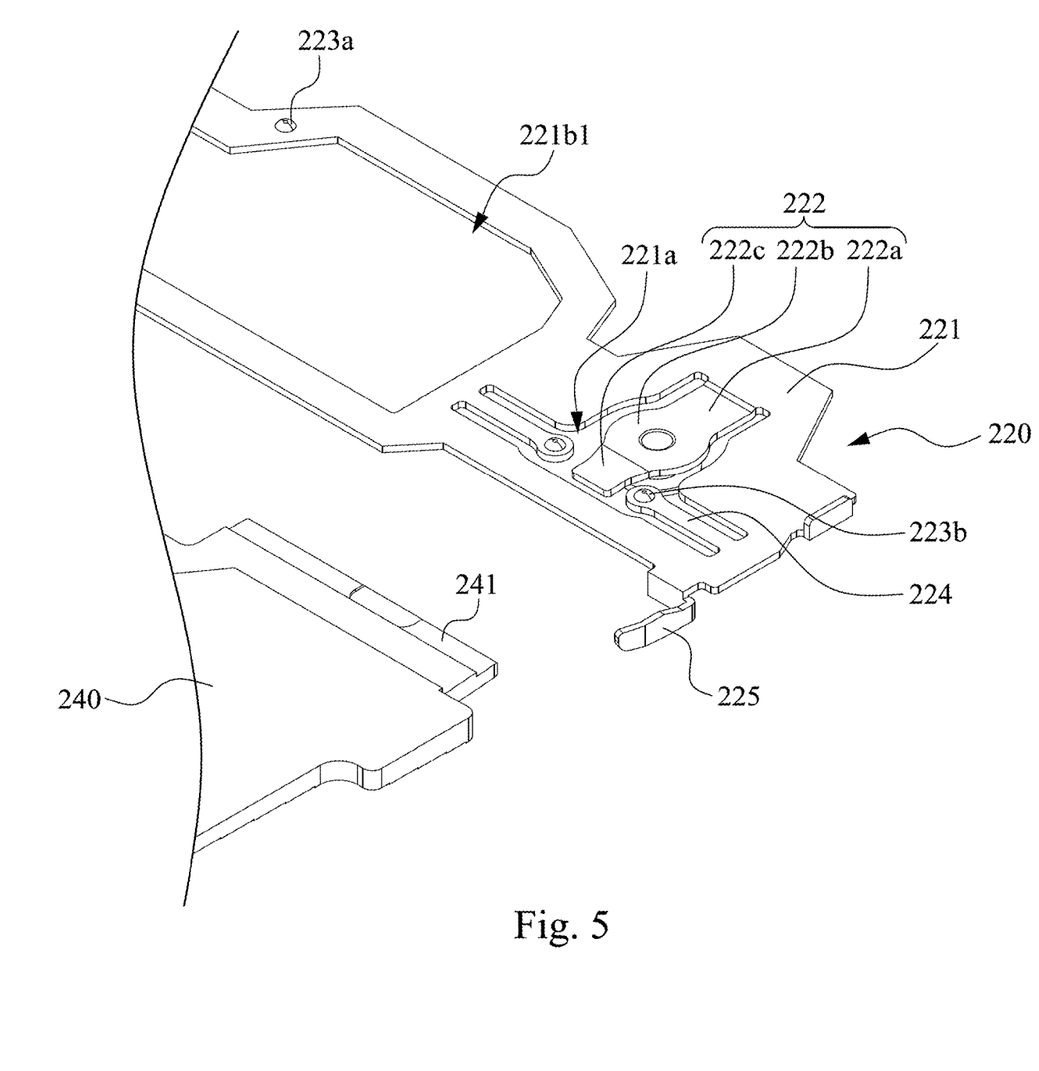
FIG. 5 is an exploded view of the hinge structure and the stiffener in FIG. 3.

Reference is made to FIG. 5. FIG. 5 is an exploded view of the hinge structure 220 and the stiffener 240 in FIG. 3. As shown in FIGS. 3 to 5, in the present embodiment, the second fixing portion 222b is connected between the first extending portion 222a and a second extending portion 222c, and the second extending portion 222c extends obliquely downward. The stiffener 240 has a retaining portion 241. The retaining portion 241 is located at an edge of the stiffener 240 and extends below an end (i.e., the second extending portion 222c) of the elastic arm 222. Therefore, as shown in FIG. 4, the second extending portion 222c of the elastic arm 222 is retained between the circuit board 230 and the retaining portion 241 of the stiffener 240. With the structural configurations, the touchpad device 200 can prevent from damage due to large deformation of the hinge structure 220 while falling down.

Figure 6:
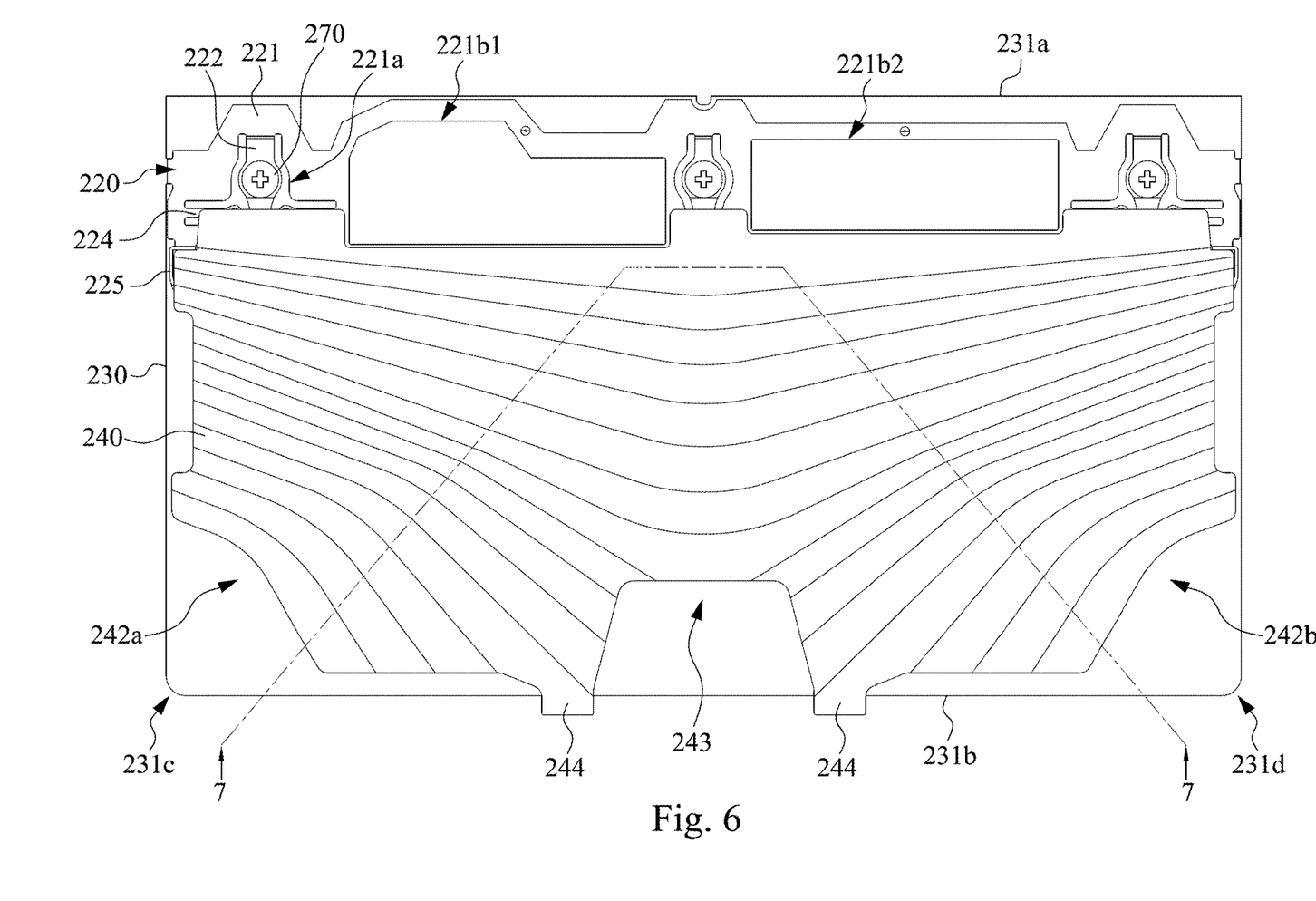
FIG. 6 is a bottom view of the hinge structure, a circuit board, and the stiffener in FIG. 2B.

Reference is made to FIG. 6. FIG. 6 is a bottom view of the hinge structure 220, the circuit board 230, and the stiffener 240 in FIG. 2B. As shown in FIG. 6, in the present embodiment, the circuit board 230 has a first edge 231a (i.e., the upper edge in FIG. 6) and a second edge (i.e., the lower edge in FIG. 6) opposite to each other. The hinge structure 220 and the stiffener 240 are respectively adjacent to the first edge 231a and the second edge 231b. An area of the stiffener 240 covering the bottom surface of the circuit board 230 is greater than an area of hinge structure 220 covering the bottom surface of the circuit board 230. A distance from the elastic arm 222 of the hinge structure 220 to the first edge 231a is smaller than that to the second edge 231b. With the structural configurations, when the user presses the cover layer 260 on the circuit board 230, the portion of the circuit board 230 adjacent to the second edge 231b will swing down more than the portion of the circuit board 230 adjacent to the first edge 231a.

As shown in FIG. 6, the circuit board 230 further has two corners 231c, 231d respectively located at two ends of the second edge 231b. The corners 231c, 231d outwardly extend from an outer edge of the stiffener 240. On the other hands, the stiffener 240 is inwardly shrunk relative to the two corners 231c, 231d of the circuit board 230 to form two unfilled corners 242a, 242b. In addition, as shown in FIG. 2B, the housing 210 further has a stopper portion 214. The stopper portion 214 extends into the opening 211 from the inner edge of the opening 211 and extends below a central portion of the circuit board 230 adjacent to the first edge 231a. The stiffener 240 further has a notch 243. The notch 243 is aligned up and down with the stopper portion 214. Therefore, the circuit board 230 that swings downward can abut against the stopper portion 214. With the structural configurations, even if downwardly swing amplitudes of the corners 231c, 231d of the circuit board 230 are large, the stiffener 240 can still avoid colliding with the objects below (because the stiffener 240 has the unfilled corners 242a, 242b inwardly shrunk relative to the corners 231c, 231d). As such, the circuit board 230 has enough pressing stroke, so as to provide a better pressing feeling to the user and is conducive to the thinness of the touchpad device 200.

Figure 7:
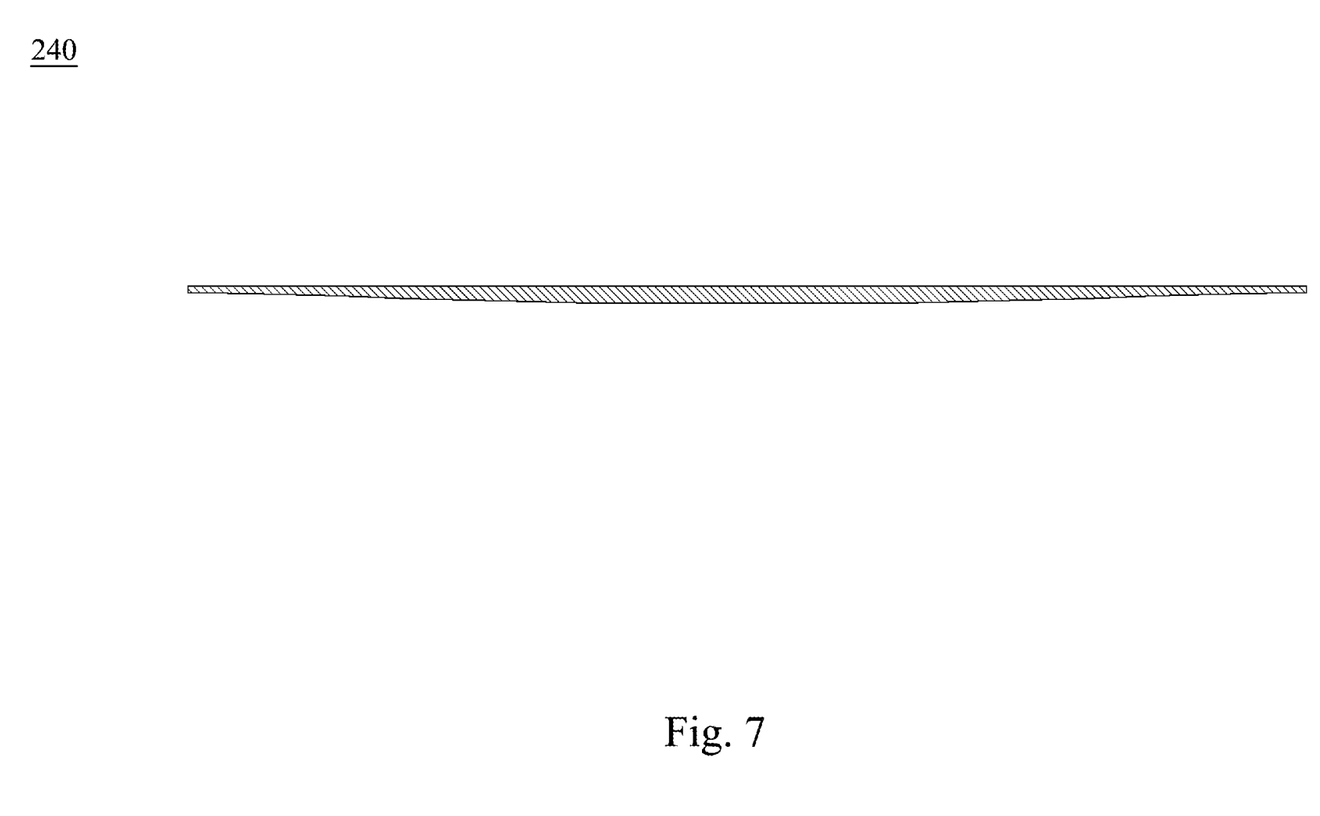
FIG. 7 is a cross-sectional view of the stiffener in FIG. 6 taken along line 7-7.

Reference is made to FIG. 7. FIG. 7 is a cross-sectional view of the stiffener 240 in FIG. 6 taken along line 7-7. As shown in FIGS. 6 and 7, in the present embodiment, to further avoid the possibility that the stiffener 240 collides with the objects below, thicknesses of the stiffener 240 are reduced substantially from the first edge 231a to two ends of the second edge 231b. In other words, the stiffener 240 is thicker at a location corresponding to the center of the first edge 231a and gradually thins toward both ends of the second edge 231b. Because the top surface of the stiffener 240 is attached to the bottom surface of the circuit board 230, the bottom surface of the stiffener 240 is a three-dimensional surface with high and low undulations. Therefore, the stiffener 240 is thinner at locations corresponding to the two ends of the second edge 231b and two sides of the circuit board 230. As such, the circuit board 230 has enough pressing stroke, so as to provide a better pressing feeling to the user and is conducive to the thinness of the touchpad device 200.

As shown in FIG. 7, in the present embodiment, the bottom surface of the stiffener 240 forms a plurality of step structures (similar to the appearance of a terrace), thereby producing thickness variations, but the disclosure is not limited in this regard. In practical applications, the bottom surface of the stiffener 240 can be a smooth three-dimensional surface.

As shown in FIGS. 2B and 6, in the present embodiment, the housing 210 further has a slot 213. The slot 213 is located at the inner wall of the opening 211. The stiffener 240 has a protruding portion 244. The protruding portion 244 extends from an edge of the stiffener 240 and partially inserts into the slot 213. Specifically, the slot 213 is connected to the bottom surface of the housing 210 and spaced apart from the top surface of the housing 210. With the structural configurations, the cover layer 260 can be prevented from rising up (because the path in which the protruding portion 244 moves upward is blocked by the housing 210).

Reference is made to FIG. 8. FIG. 8 is a partial top view of the hinge structure 220 in FIG. 2B. As shown in FIG. 8 with reference to FIG. 4, in the present embodiment, the touchpad device 200 further includes an edge frame 250. The edge frame 250 includes a base 251 and a sidewall 252 connected to each other. The base 251 is attached to the bottom surface of the circuit board 230. The sidewall 252 abuts against the edge of the circuit board 230. In addition, the sidewall 252 further abuts against an edge of the cover layer 260. By the sidewall 252 of the edge frame 250 for the circuit board 230 and the cover layer 260 to abut against, not only the edges of the circuit board 230 and the cover layer 260 can be decorated, but the assembler can be assisted to quickly carry out the alignments of the circuit board 230 and the cover layer 260.

As shown in FIG. 8, a gap G is formed between the main body 221 of the hinge structure 220 and the edge frame 250. At least a part of the gap G is substantially S-shaped (by forming convex and concave portions on the hinge structure 220 and the edge frame 250 respectively). Moreover, the gap G may be zigzag in shape of reciprocating bending. With the structural configurations, the adhesive area of the bottom surface of the circuit board 230 can be evenly distributed to the hinge structure 220 and the base 251 of the edge frame 250, so that the base 251 that covers less area can be prevented from easily separated from the circuit board 230, thereby increasing the strength and durability of product.

In some embodiments, the hinge structure 220 and the edge frame 250 form a unitary piece.

Figure 9:
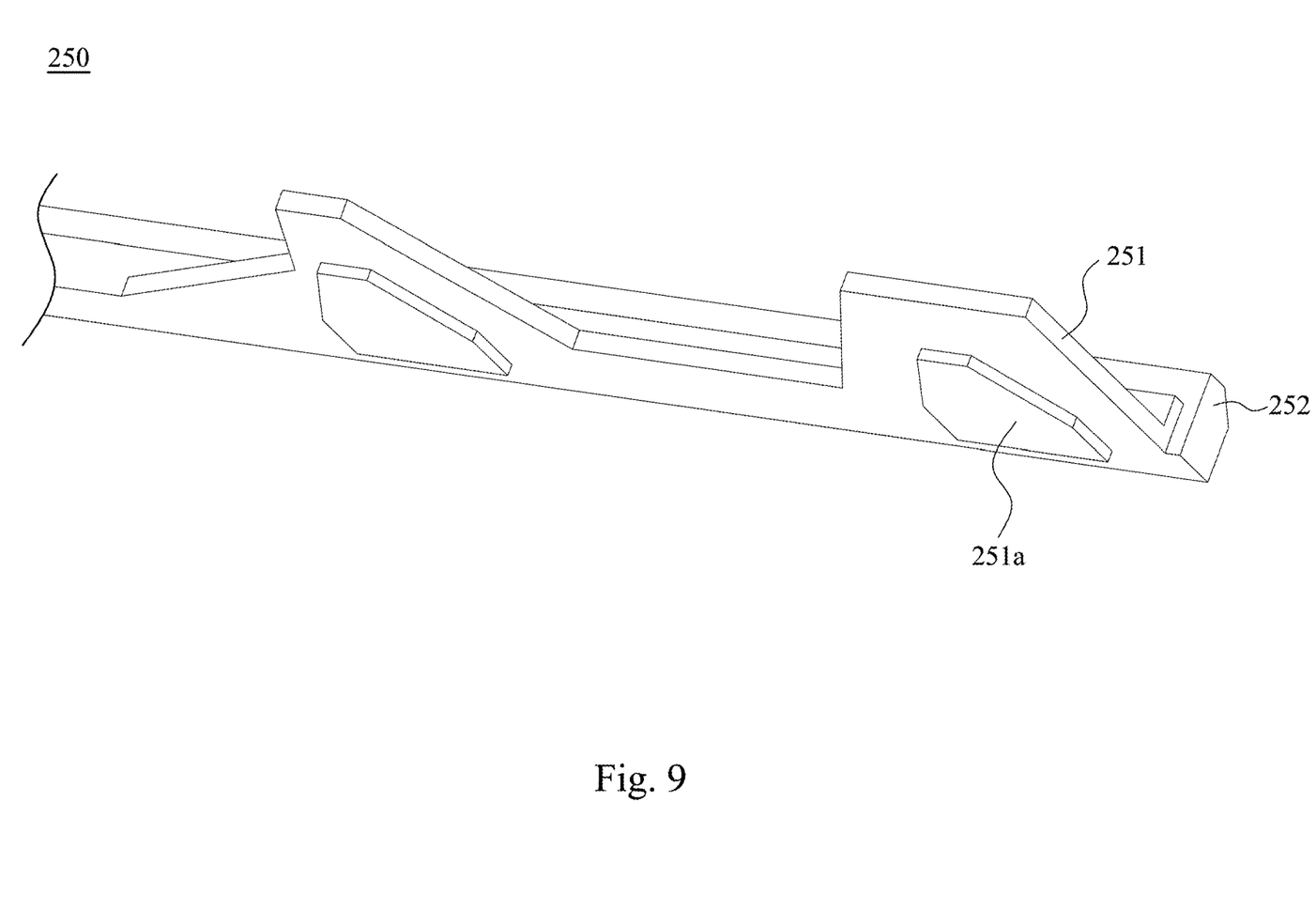
FIG. 9 is a partial perspective view of an edge frame in FIG. 2B.

Reference is made to FIG. 9. FIG. 9 is a partial perspective view of the edge frame 250 in FIG. 2B. As shown in FIG. 9, in the present embodiment, the base 251 has a plurality of protrusions 251*a* at the bottom surface thereof. The protrusions 251*a* can increase the whole thickness of the base 251, so as to increase the structural strength. In addition, in some embodiments in which the material of the edge frame 250 includes plastic, the formation of the protrusions 251*a* also prevents the material shrinkage of the base 251 due to its too thin thickness during the injection molding process.

According to the foregoing recitations of the embodiments of the disclosure, it can be seen that in the touchpad device of the present disclosure, the main body of the hinge structure is attached to the bottom surface of the circuit board, and the elastic arm of the hinge structure downwardly extends and is fixed to the housing, so that the circuit board can swing relative to the housing by actions of the hinge structure. Because the circuit board and the housing are only connected by the hinge structure, the thickness of the whole touchpad device can be effectively reduced. Furthermore, by attaching the stiffener to the bottom surface of the circuit board, the support to the circuit board can be further increased. In addition, by partially extending the stiffener below the elastic arm of the hinge structure to retain the elastic arm, the touchpad device can prevent from damage due to large deformation of the hinge structure while falling down.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A touchpad device used to connect a first fixing portion of a housing, the touchpad device comprising:
   a hinge structure, comprising:
      a main body located above the first fixing portion; and
      an elastic arm connected to the main body and comprising a second fixing portion, the second fixing portion being fixed to the first fixing portion of the housing; and
   a circuit board, wherein a bottom surface of the circuit board is attached to a top surface of the main body, so that the circuit board can swing relative to the housing by actions of the hinge structure.

2. The touchpad device of claim 1, wherein the main body has a through hole, the elastic arm further comprises a first extending portion connected between an inner edge of the through hole and the second fixing portion, and a step is formed between the first extending portion and the inner edge of the through hole.

3. The touchpad device of claim 1, wherein the hinge structure further comprises a ground bump disposed on the main body and abutting against the circuit board.

4. The touchpad device of claim 1, wherein the hinge structure further comprises:
   a cantilever extending from an edge of the main body; and
   a ground bump disposed on the cantilever and abutting against the circuit board.

5. The touchpad device of claim 1, further comprising a stiffener attached to the bottom surface of the circuit board.

6. The touchpad device of claim 5, wherein the hinge structure further comprises two clamping arms, and the stiffener is clamped between the clamping arms.

7. The touchpad device of claim 5, wherein the stiffener has a retaining portion extending below an end of the elastic arm.

8. The touchpad device of claim 5, wherein the circuit board has a first edge and a second edge opposite each other, and the hinge structure and the stiffener are respectively adjacent to the first edge and the second edge.

9. The touchpad device of claim 8, wherein thicknesses of the stiffener are reduced substantially from the first edge to two ends of the second edge.

10. The touchpad device of claim 8, wherein the stiffener is inwardly shrunk relative to two corners of the second edge of the circuit board to form two unfilled corners.

11. The touchpad device of claim 1, further comprising an edge frame attached to the bottom surface of the circuit board and abutting against an edge of the circuit board.

12. The touchpad device of claim 11, wherein a gap is formed between the main body of the hinge structure and the edge frame, and a part of the gap is substantially S-shaped.

13. The touchpad device of claim 11, wherein the edge frame comprises a base and a sidewall connected to each other, the base is attached to the bottom surface of the circuit board, and the sidewall abuts against the edge of the circuit board.

14. The touchpad device of claim 13, wherein the base has a plurality of protrusions at a bottom surface thereof.

* * * * *